March 26, 1940.  D. A. WALLACE ET AL  2,195,048
CRANKSHAFT LAPPING MACHINE
Filed Oct. 24, 1936   3 Sheets-Sheet 1

INVENTORS.
David A. Wallace,
Edward C. Lee.
BY
Barnes, Lind, Pater & Harris.
ATTORNEYS.

March 26, 1940.   D. A. WALLACE ET AL   2,195,048
CRANKSHAFT LAPPING MACHINE
Filed Oct. 24, 1936      3 Sheets-Sheet 2

INVENTORS.
David A. Wallace,
Edward C. Lee.
BY
ATTORNEYS.

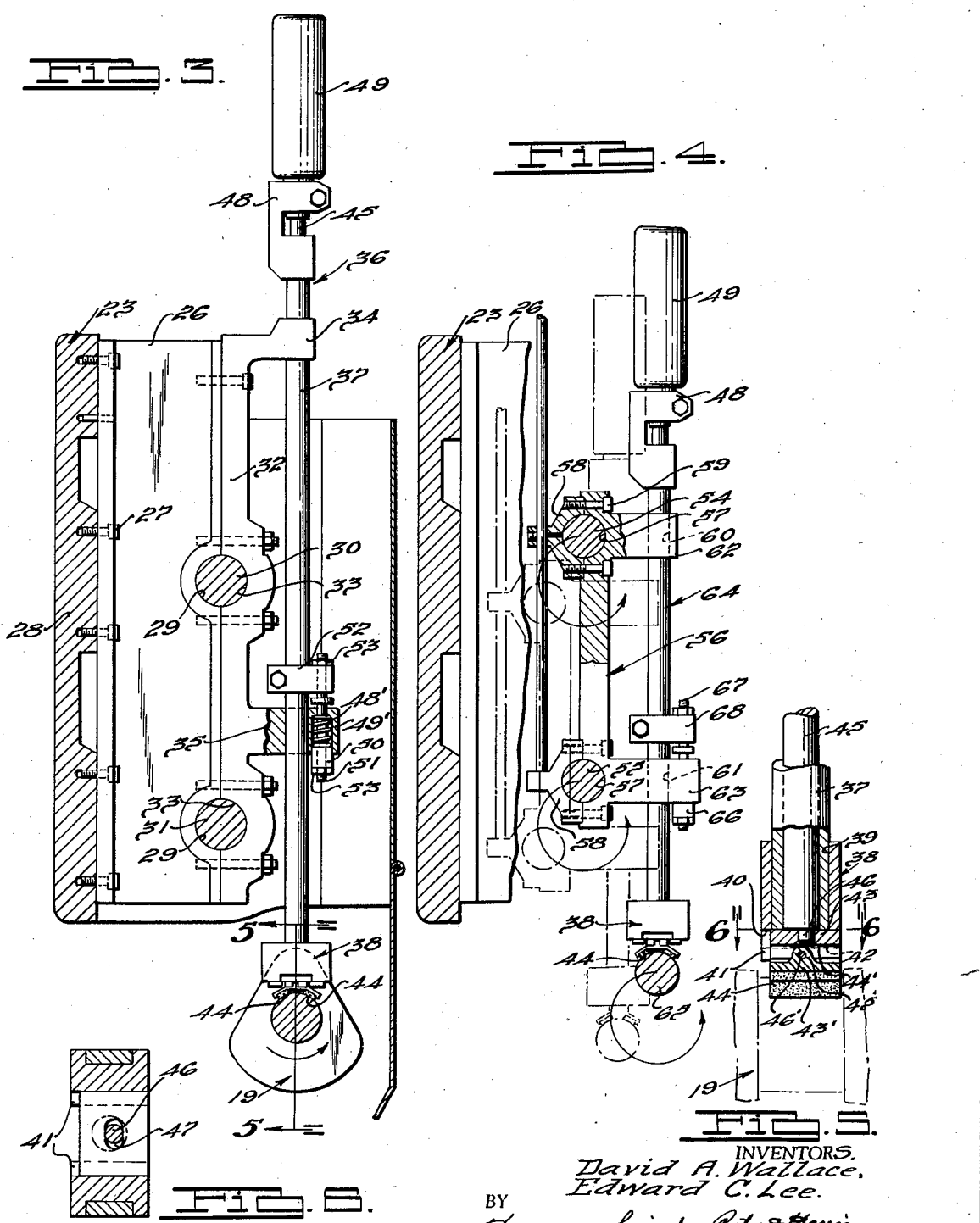

Patented Mar. 26, 1940

2,195,048

UNITED STATES PATENT OFFICE 2,195,048

CRANKSHAFT LAPPING MACHINE

David A. Wallace and Edward C. Lee, Detroit, Mich., assignors to Chrysler Corporation, Highland Park, Mich., a corporation of Delaware Application October 24, 1936, Serial No. 107,377

6 Claims. (Cl. 51—59)

This invention relates to improved crankshaft bearing lapping apparatus and is a further development of the invention disclosed in application Serial No. 91,851, filed July 22, 1936.

More particularly, the invention pertains to the provision of an improved apparatus for simultaneously lapping both the main bearings and the crank throw bearings of multiple throw chankshafts of the character used in multiple cylinder, internal combustion engines, compressors and the like.

One of the main objects of the invention is to provide an improved crankshaft lapping machine by which both the main and crank throw bearings of a multiple throw crankshaft may be simultaneously subjected to the action of a lapping element during rotation of such bearings in their normal manner and while the lapping element is reciprocated axially of the bearings at a rate substantially of a vibratory order.

Another object of the invention is to provide in an apparatus of this character, an individual lapping tool for each bearing of a crankshaft which is yieldably urged toward the bearing it operates upon with a uniform and predetermined force during rotation of the crankshaft in its normal manner.

Further objects of the invention are to provide mechanism for causing the working ends of the tools which operate upon the crank throw bearings to follow the paths of the latter during rotation of the crankshaft without supporting the tools on the crankshaft or relying upon the coaction between the crankshaft and the tools to drive the crankshaft or the tools, one by or from the other, so as to guard against variation of the pressure by which the working ends of the tools are applied to the bearings by the aforesaid yieldable tool urging means; and to provide a lapping device which embraces and operates upon only one half or less than one half of the circumference of each bearing in order to accommodate removal of lapping devices from and replacement thereof on the bearings by relative movements of the devices away from and toward the axis of the crankshaft sections and without requiring manual attachment and detachment of the lapping devices.

Still further objects of the invention are to provide unitary assembly of all the tools on a common shiftable support by which they may be simultaneously moved into and out of operative relationship with respect to the crankshaft constituting the work; to provide means for indexing the crankshaft operated upon with respect to the tool carrying and driving apparatus and to so drivingly connect the crankshaft and the tool carrying apparatus as to maintain synchronism between the movements of the ends of the tools and the respective crank throw bearings upon which they operate, in order that the tools may be retracted from their respective bearings of the crankshaft and replaced thereon, or on corresponding bearings of another crankshaft, regardless of the instantaneous positions of the crankshaft and without manual adjustment and setting of the machine.

Additional objects of the invention are to provide on the respective lapping tools, individual driving means for reciprocating the lapping element thereof relative to the main body portions of the tools at a comparatively high rate; to provide a pair of master crankshafts which are substantially identical to the crankshaft to be lapped for supporting the tools, and to provide a positive interconnecting driving mechanism between the master crankshafts and the work supporting driving mechanism which synchronizes the master crankshafts with the work and provides for supporting of substantially the entire weight of the tools independently of the work.

An illustrative embodiment of the invention is shown in the accompanying drawings, in which:

Fig. 3 is a fragmentary transverse vertical sectional view taken on the line 3—3 of Fig. 1.

Fig. 4 is a fragmentary transverse vertical sectional view taken on the line 4—4 of Fig. 1.

Fig. 5 is a fragmentary longitudinal sectional view taken on the line 5—5 of Fig. 3.

Fig. 6 is a horizontal sectional view taken on the line 6—6 of Fig. 5.

Figure 1:
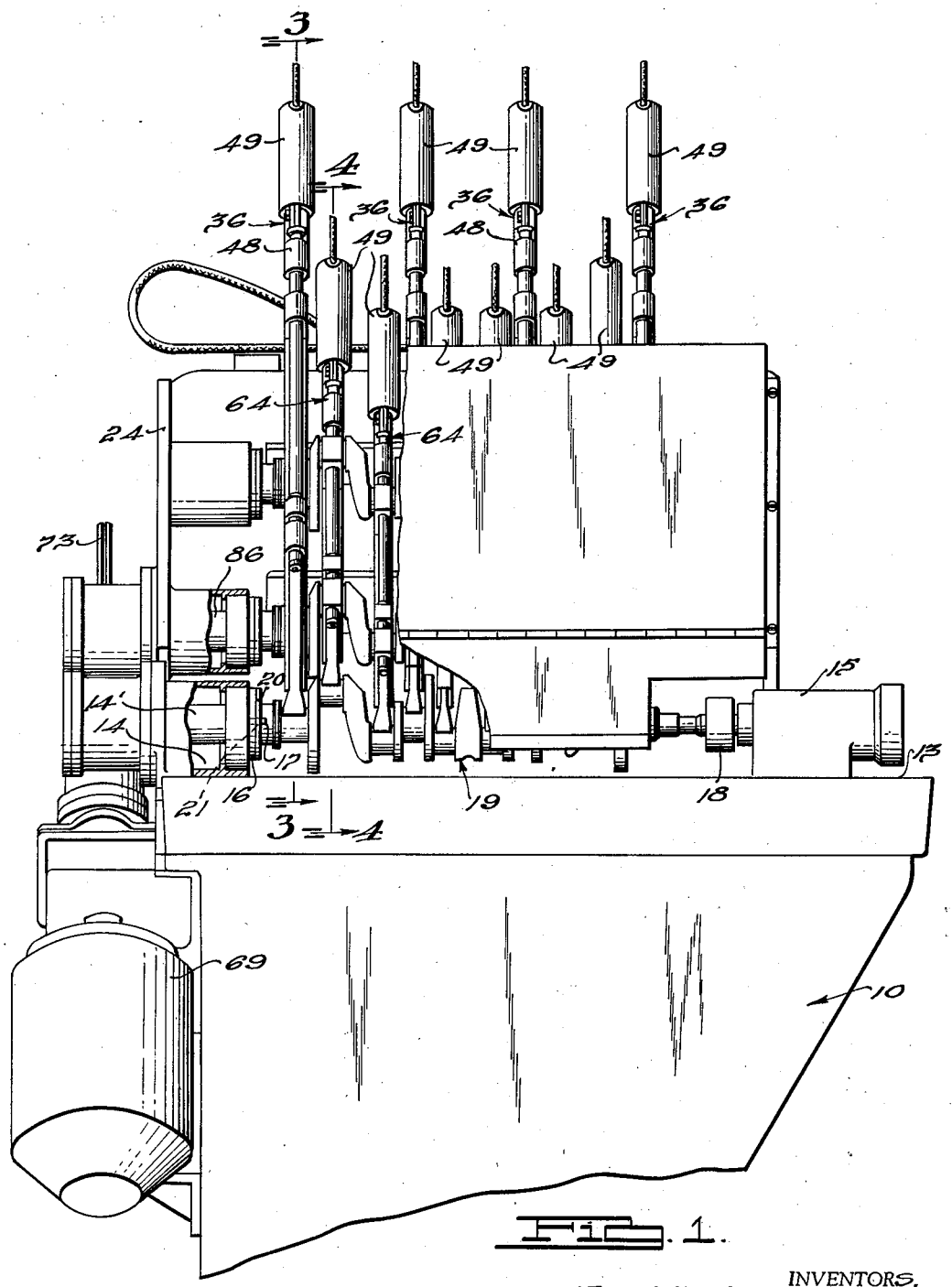
Fig. 1 is a front elevational view of a crankshaft lapping machine embodying the invention.
Figure 2:
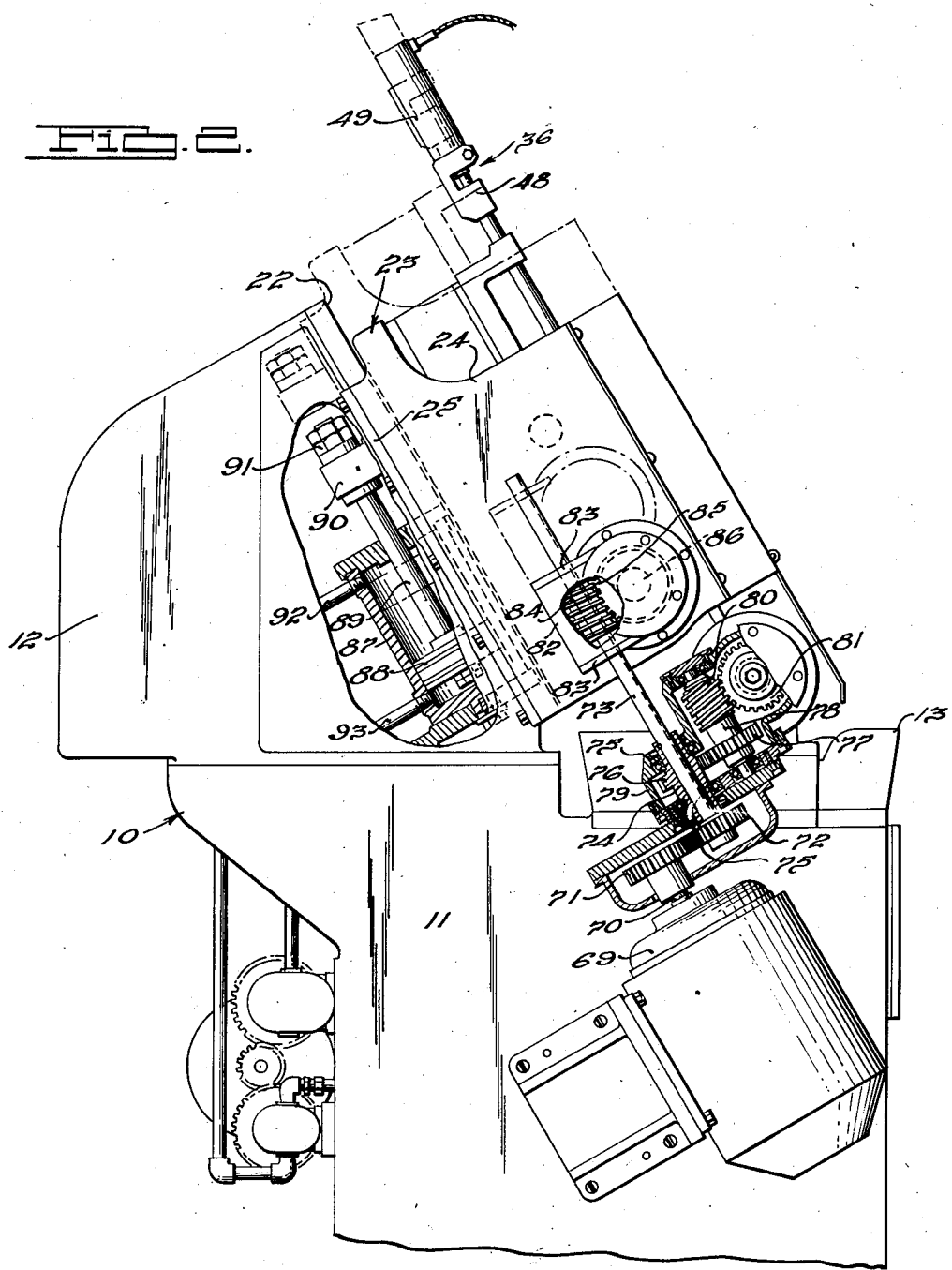
Fig. 2 is an end elevational view showing the crankshaft lapping machine partly in section as viewed from the left of Fig. 1.

The lapping apparatus illustrated in the drawings, comprises a machine bed, generally designated by the numeral 10, which includes a base portion 11 and a rearwardly offset back portion 12. The base portion 11 of the machine bed has a horizontal table part 13 on which is mounted spaced live and dead spindle housings 14 and 15, respectively. Journalled in the housing 14 is a live spindle 14' having an external driving flange 16 provided with an outwardly extending pin 17. A dead spindle 18 is mounted on the housing 15. The crankshaft, generally designated by the numeral 19, to be lapped is receivable between the live and dead spindle and adapted to be supported thereby. The work crankshaft 19 is provided with a flange 20 having an aperture 21 therein for receiving the pin 17 of the live spindle flange 16 and by which the crankshaft is both indexed with respect to the live spindle and rotated thereby. The dead spindle 18 is preferably shiftable axially of the crankshaft 19 in order to accommodate convenient replacement and removal of the work crankshaft from the machine.

The back portion of the machine bed has rearwardly inclined slide faces 22 on which there is slidably mounted a tool carriage, generally designated by the numeral 23. The slide face portions 22 extend outwardly from the opposite ends of the back part of the machine bed and the side members 24 of the carriage 23 extend rearwardly to substantially the same plane as the rear surfaces of the slide face members 22. A cleat 25 is bolted on the rearwardly extending portions of each end wall 24 of the carriage 23 so as to hold the carriage against displacement from the machine bed back portion 12. Spaced bearing blocks 26 are secured by bolts 27 to the rear wall 28 of the carriage 23, as illustrated in Fig. 3. The bearing blocks 26 are provided with upper and lower bearing cavities 29 in which the main bearings of master crankshafts 30 and 31 are rotatively mounted. There are preferably as many bearing blocks 26, each provided with upper and lower aligned series of bearing cavities 29, as there are main bearings on the crankshafts 30 and 31. The crankshafts 30 and 31 are substantially identical in construction, particularly as to their crank throw angularity, with the work crankshafts 19 to be operated upon. Secured to each bearing block 26 is a bearing cap member 32 having upper and lower bearing cavities 33 which register respectively with the bearing cavities 29 of the bearing block 26.

The bearing cap members 32 are each provided with forwardly extending arms 34 and 35 having apertures in which a lapping tool, generally designated by the numeral 36, is shiftably mounted. Each lapping tool 36 is adapted to operate upon one of the main bearings of the work crankshaft 19 as illustrated in Fig. 3. Each tool 36 comprises a tubular body portion 37 on which is mounted a tool head, generally designated by the numeral 38, having an aperture therein in which the tubular body portion 37 of the tool is received. The tool head 38 is also provided, at its lower end, as viewed in Fig. 5, with a transversely extending channel 40 which is substantially parallel to the axis of the work crankshafts 19. The side walls of the channel 40 have inwardly extending flanges 41 which extend into grooves 42 of a slide block 43 which is slidably mounted in the channel 40. Pivotally and removably mounted on the slide block 43 is a lapping element carrier 43' in which lapping element 44, comprising natural, compressed or otherwise formed lapping stones or other suitable lapping substance. The slide block 43 has a channel 44' in its lower side in which the carrier 43' is received. Provided on the carrier 43' is an apertured ear 45' through which a removable pin 46' extends, the pin being received in registering apertures in the side walls of the channel 44'.

The working sides of the lapping elements are preferably formed to conform to the curvature of the main bearing of the work crankshaft 19. The lapping element carrier 43' and the slide block 43 are adapted to be drivingly reciprocated in the direction of the axis of the crankshaft 19 by a shaft 45 having an eccentrically located pin 46 on its lower extremity engaged in an elongated slot 47 formed in the upper end portion of the slide block 43. Mounted on the upper end of the tubular body portion 37 of the tool 36 is a bracket 48 on which is supported an electric motor 49, or other suitable driving mechanism, which is operatively connected with the drive shaft 45.

The tool 36 is preferably, yieldably urged downwardly toward the work crankshaft 19 by a spring 48 disposed in a socket 49' formed in the forwardly extending arm 35 of the bearing cap member 32. The spring 48' serves between the inner ends of the socket 49' and a collar 50 adjustably mounted on a bolt 51 carried by a bracket 52 securely clamped to the tubular body portion 37 of the tool 36. The bolt 51 is provided with nuts 53 by which the compression of the spring 48' may be predetermined in order to predetermine the pressure with which the lapping elements 44 are urged against the main bearing of the crankshaft. A tool 36 is provided, and yieldably mounted in the foregoing manner, to operate upon each of the main bearings respectively of the work crankshaft 19.

The crank throw bearings 54 and 55 of the upper and lower master crankshaft 30 and 31 are connected together by link members, generally designated by the numeral 56. Each link member 56 is provided with a bearing cavity 57 at its respectively opposite end portions and operatively mounted on corresponding pairs of crank throw bearings 54 and 55 of the master crankshafts by bearing cap 58 which are detachably secured to the links by bolts 59.

Shiftably mounted in apertures 60 and 61 of forwardly extending arms 62 and 63, respectively, on the link 56, is a tool, generally designated by the numeral 64, which is substantially identical in construction to the lapping tool 36 shown in Fig. 3. The lapping tool 64 is somewhat shorter in overall length, than the lapping tool 63, but all of the parts thereof are of similar or substantially identical construction and they are designated by the same numerals. The lapping elements 44 of the tool 64 are yieldably urged against a crank throw bearing 65 of the work crankshaft 19 by a spring, similar to and mounted in accordance with the disclosure of the spring 48' shown in Fig. 3, which bears between a collar 66 carried by a bolt 67 which is in turn mounted on the body portion of the tool 64 by a bracket 68. The motor 49 of the tool 64 oscillates the lapping elements 44 thereof axially of the crank throw bearings 65 in the manner described in the discussion of Figs. 3 and 5. One lapping tool 64 is provided, and mounted in the manner illustrated in Fig. 4, for operating upon each crank throw bearing 65 of the work crankshaft 19, respectively.

The master crankshafts 30 and 31 and the work crankshaft 19 are drivingly rotated in synchronism with each other by driving mechanism mounted on the left end of the lapping machine, as viewed in Fig. 1. This driving mechanism comprises a motor 69 having a shaft 70 on which a pinion 71 is mounted. The teeth of the pinion 71 are meshed with teeth of a pinion 72 fixed to a shaft 73. Splined on the shaft 73 is a sleeve 74 which is journalled in bearings 75 for rotatably supporting the shaft 73. The sleeve 74 is provided with pinion teeth 76 which are in turn meshed with gear teeth 77 provided on a shaft 78. The sleeve 74 and the shaft 78 are supported in a housing 79 which is mounted on the left end of the lapping machine as illustrated in Fig. 1. Formed on the shaft 78 is a worm 80 which meshes with teeth of a worm wheel 81 carried by the live spindle 14' which drives the work crankshaft 19. The shaft 73 extends upwardly from the location of the motor 69 substantially to the elevation of the uppermost master crankshaft 30 and its upper end portion is slidably mounted in a bracket 82 fixed to the end wall 24 of the carriage 23. The bracket 82 has outwardly extending apertured end flanges 83 on its opposite extremities for guiding the upper end portion of the shaft 73 and between which is disposed a worm 84 which is splined on and slidably mounted relative to the shaft 73. The worm 84 is meshed with a worm gear 85 fixed on a spindle 86, disposed coaxially with the lower master crankshaft 31 and drivingly connected directly thereto as illustrated in Fig. 1. The sliding splined connection between the worm 84 and the shaft 73 accommodates reciprocatory movement of the tool carriage 23 to move the working ends of the tools to and from the work crankshaft 19 for permitting removal and replacement of work crankshafts, as hereinafter described.

Mounted on the left end of the lapping machine, as viewed in Fig. 1, is a pneumatic cylinder 87 in which is reciprocably mounted a piston 88 having a piston rod 89 rigidly fixed to the tool carriage 23 by a bracket 90 and bolt 91. The interior of the cylinder 87 is communicatively connected with a source of pneumatic pressure by conduits 92 and 93 which, under the control of valve mechanism (not shown) applies fluid under pressure to either the upper or the lower ends of the cylinder 87 so as to lower and raise the tool carriage 23 selectively. The raising and lowering of the tool carriage 23 causes simultaneous disengagement and engagement, respectively, of all of the working ends of the lapping tools 36 and 64 with respect to their associated bearings of the work crankshaft 19.

By virtue of the foregoing construction, substantially the entire weight of each lapping tool is supported by the master crankshaft and the lapping elements of the working ends of the tools which operate upon the crank throw bearings of the work crankshaft 19 are controlled in their movement so as to follow the paths of movement of the crank throw bearing. By driving the work crankshaft 19 and the lowermost master crankshaft 31 which in turn drives the upper master crankshaft 30 through the medium of the link members 56, the lapping tools 64 are not relied upon to drivingly connect the work crankshaft 19 with either of the master cranks. This enables the use of lapping devices on the working ends of the lapping tools which embrace not more than one half of the circumference of the bearings and guard against the application of uniform pressure on the lapping elements. The lapping elements are yieldably urged against the associated bearings of the work crankshaft with uniform pressure by the springs 48'. Lapping elements of this character which do not embrace more than one half the circumference of the bearings also facilitate convenient removal and application of the lapping elements from and to the work crankshaft respectively. When a work crankshaft is mounted on the live and dead spindles 14' and 18 of the lapping machine, the crank throws thereof are so indexed with respect to the crank throws of the master crankshaft and the ends of the lapping tool as to permit each lapping tool to be brought into proper operative engagement with its associated bearing by merely lowering the tool carriage 23 on its support and without requiring manual adjustment or setting of the working ends of the lapping tools with respect to those bearings upon which they operate. This indexing of the crank throw bearings of the crankshaft 19 is accomplished by properly inserting the pin 17 of the driving end of the live spindle 14' in the aperture 21 of the work crankshaft flange 20 as previously set forth.

During operation of the improved crankshaft lapping machine, the work crankshaft 19 is rotated while the lapping elements are in operative engagement with the bearings thereof and the lapping elements are reciprocated axially of the crankshaft at a comparatively high rate of speed of a substantially vibratory order. The resultants of the reciprocatory movement of the lapping element and the rotative movement of the bearing relative thereto during each direction of reciprocation of the lapping element extend at opposite inclinations with respect to each other. It is preferable to so predetermine the velocities of these rotative and reciprocatory movements as to cause the resultants of the movements produced during successive half cycles of the reciprocatory movement to intersect at substantially right angles to each other. However, since the velocity of the reciprocatory movement varies, this condition is not maintained at all times but is approached throughout the main portion of the strokes of the lapping element. Localized hard areas of the lapping surfaces, therefore, trace inscriptions, of a microscopic order, on the surface of the work during successive half cycles of the reciprocatory movement which are crosshatched at a plurality of different angles forming a heterogeneous arrangement of crosshatched scratch lines, none of which develop into deep grooves or scores. This action substantially eliminates all traces of the ridges formed by the machining and grinding operation to which the work had previously been subjected without replacing such ridges by lap-formed irregularities. The ridges are in effect lapped off to a bore line established by uninterrupted metal continuity of the surface operated upon. While it is preferable to so predetermine the linear velocities of the movement of the work and movement of the lapping element as to bring the main portions of the scratch lines to approach right angle relationship with respect to each other, it is found that excellent results are obtained when the angularity of the lines traced during successive half cycles of the reciprocatory movement is such that the minimum angle therebetween is substantially forty degrees. In other words, the resultant of the movement of the work and movement of the lapping element may vary from inclinations of substantially twenty to substantially seventy degrees to the path of reciprocatory movement.

Although but one specific embodiment of the invention is herein shown and described, it will be understood that various changes in the size, shape and arrangement of parts may be made without departing from the spirit of our invention.

We claim:

1. Crankshaft lapping apparatus including a support, means mounted thereon for rotatively supporting a crankshaft to be lapped, a lapping tool having a lapping element reciprocably mounted thereon and engageable with a crank throw bearing of said crankshaft, means independent of said crankshaft for supporting, drivingly moving and confining the movement of said lapping element through substantially the same path as said crank throw bearing moves during rotation of said crankshaft on said axis, and means for reciprocating said lapping element relative to the major portion of said tool.

2. Crankshaft lapping apparatus including a support, means mounted thereon for rotatively supporting a crankshaft to be lapped, a lapping tool having a lapping element reciprocably mounted thereon and engageable with a crank throw bearing of said crankshaft, means for supporting said tool and drivingly moving said lapping element through substantially the same path as said crank throw bearing moves during rotation of said crankshaft on said axis, and means for reciprocating said lapping element relative to the major portion of said tool including a driving member carried by said tool and constructed and arranged to reciprocate said lapping element at a rate approaching a vibratory order.

3. Crankshaft lapping apparatus including a support, means mounted thereon for rotatively supporting a crankshaft to be lapped, a lapping tool having a lapping element reciprocably mounted thereon and engageable with a crank throw bearing of said crankshaft, means for supporting said tool and drivingly moving said lapping element through substantially the same path as said crank throw bearing moves during rotation of said crankshaft on said axis, said means including a member for shiftably attaching said tool thereto and a resilient element for yieldably urging said lapping element into operative engagement with said crank throw bearing with a predetermined pressure, and means for reciprocating said lapping element relative to the main portion of said tool.

4. Crankshaft lapping apparatus including a machine bed structure, means thereon for rotatively supporting a crankshaft to be lapped on its normal axis, a pair of master crankshafts rotatively mounted on said bed structure about axes substantially parallel to said normal axis and each being substantially identical in crank throw arrangement to said crankshaft to be lapped, means for driving said crankshafts in synchronism with each other, a lapping tool having a lapping element reciprocally mounted on its working end and engageable with the corresponding crank throw bearing of said crankshaft to be lapped and adapted to be moved by said master crankshafts throughout the path said latter crank throw bearing moves during rotation of said crankshaft to be lapped, and means on said tool for drivingly reciprocating said lapping device.

5. Crankshaft bearing finishing apparatus including a support, means mounted on said support for rotatably supporting a crankshaft having a crank throw bearing to be finished, a tool having an abrading element engageable with said bearing and reciprocable relative thereto and to the main body portion of said tool in a course substantially parallel to the axis of said crankshaft, means for supporting said tool and drivingly moving said abrading element through substantially the same path as said crank throw bearing moves during rotation of said crankshaft, and means for reciprocating said abrading element in said course relative to said main body portion of said tool and to said bearing.

6. Finishing apparatus including a support, means on said support for rotatably supporting a piece of work, a tool comprising a tubular shank portion and having an abrading element reciprocably mounted on one end for movement transversely of the longitudinal axis of said shank portion, said abrading element being engageable with said work and reciprocable relative to said shank portion and work in a course substantially parallel to the rotative axis of said work, means operating upon said tool for normally yieldably urging the latter and said element toward said work, and mechanism for drivingly reciprocating said abrading element in said course including a rotative driving member located at the other end of said shank portion and rotative movement transmitting apparatus extending through the latter and means at the end of said shank adjacent said abrading element operatively connected with said abrading element for converting rotative to reciprocatory movement.

DAVID A. WALLACE.
EDWARD C. LEE.